E. McFADDEN.
GRAIN ELEVATORS FOR HARVESTERS.
No. 180,253. Patented July 25, 1876.
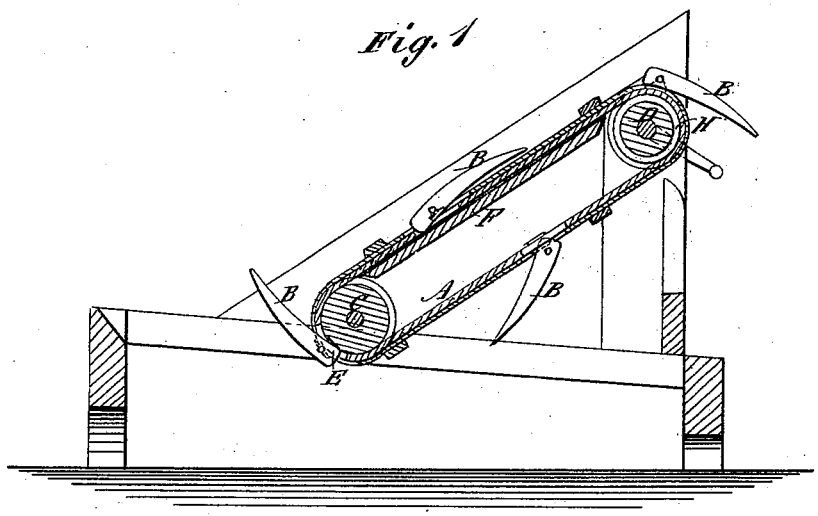
Fig. 1
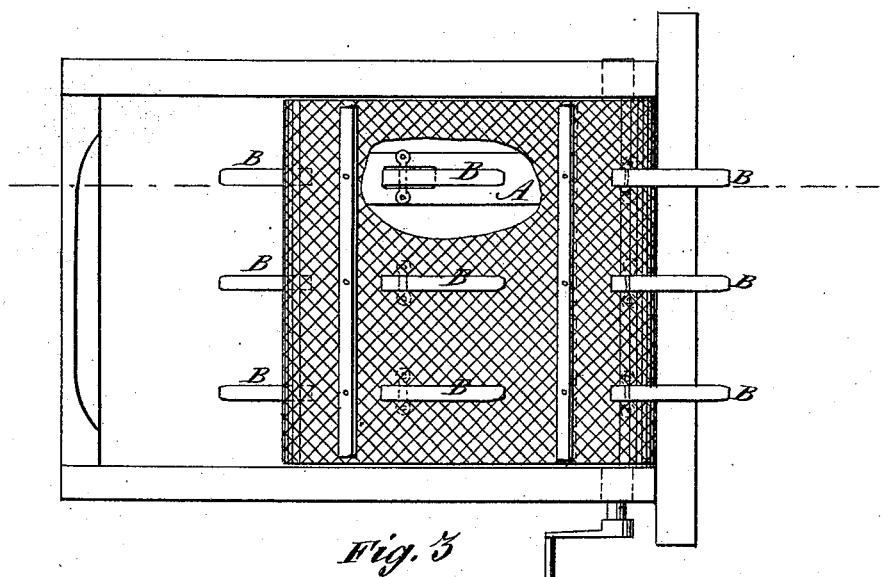
Fig. 2
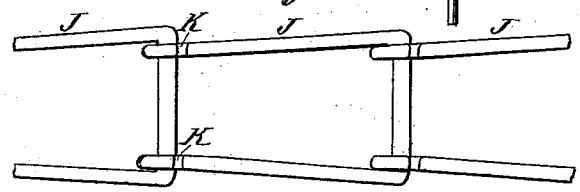
Fig. 3
Fig. 4
WITNESSES:
C. Neveux
John Goethals
INVENTOR:
E. McFadden
BY
Munn & Co
ATTORNEYS.

UNITED STATES PATENT OFFICE.

EBENEZER McFADDEN, OF SPARTA, ILLINOIS.

IMPROVEMENT IN GRAIN-ELEVATORS FOR HARVESTERS.

Specification forming part of Letters Patent No. 180,253, dated July 25, 1876; application filed April 18, 1876.

*To all whom it may concern:*

Be it known that I, EBENEZER McFADDEN, of Sparta, in the county of Randolph and State of Illinois, have invented a new and Improved Grain-Elevator for Harvesters, of which the following is a specification:

My invention is a contrivance of the teeth, the apron, and the rollers which work the apron, for allowing the teeth to swing back automatically to pass the trough into which the grain falls, and in like manner take the required position for taking up the grain.

Figure 1 is a longitudinal sectional elevation of my improved elevator, taken on the line $x\ x$ of Fig. 2. Fig. 2 is a plan view. Fig. 3 is a plan, and Fig. 4 is a longitudinal section, of the links for the endless carrier for the teeth.

Similar letters of reference indicate corresponding parts.

A represents the endless carrier, to which the teeth B are pivoted, and which is carried on the rollers C D. The teeth extend a little at E beyond the pivots by which they are connected to the carrier, so that the lower roller throws them out, as shown at the lower end, to take the grain, and the board F turns them down to hug the grain close, but the upper roller is grooved at H to allow the teeth to swing back freely to pass the grain-trough, into which the grain falls.

If the quantity of grain is large, the heels E of the teeth raise the carrier above the board F, and thus tighten it on the rollers, to increase the friction of the carrier on the rollers as its work increases.

Instead of using leather belts for the carrier, I propose to employ chain-links J, with hook-eyes L for coupling them together, the said eyes being so contrived at the openings K, and the cross-bars I being so flattened and broadened that they cannot disconnect, except the cross-bar be presented edgewise to the opening, which cannot well occur in the ordinary operations of the carrier.

Having thus described my invention, I claim as new and desire to secure by Letters Patent—

1. In an elevator for grain, the teeth B, extended at E behind the pivots, in combination with a tripping device, whereby they will be forced to press the grain continuously in their upward passage, as set forth.

2. In a grain-elevator, having teeth with extensions E, the upper roll H, grooved to allow the teeth to loosen their hold upon the grain, as specified.

EBENEZER McFADDEN.

Witnesses:
S. LOVEJOY TAYLOR,
JOHN TAYLOR.